United States Patent
Liu et al.

(10) Patent No.: US 6,414,470 B1
(45) Date of Patent: Jul. 2, 2002

(54) APPARATUS AND METHOD FOR BALANCING CHANNEL CURRENTS IN A MULTI-PHASE DC-TO-DC CONVERTER

(75) Inventors: Jing-Meng Liu, Hsinchu; Liang-Pin Tai, Tainan; Hung-I Wang, Changhua, all of (TW)

(73) Assignee: Richtek Technology Corp., Hsinchu (TW)

( * ) Notice: Subject to any disclaimer, the term of this patent is extended or adjusted under 35 U.S.C. 154(b) by 0 days.

(21) Appl. No.: 10/051,136

(22) Filed: Jan. 22, 2002

(51) Int. Cl.[7] .................................................. G05F 1/40
(52) U.S. Cl. ...................................... 323/272; 323/285
(58) Field of Search .............................. 323/272, 285, 323/286

(56) References Cited

U.S. PATENT DOCUMENTS 4,924,170 A * 5/1990 Henze ........................ 323/272
6,198,261 B1 * 3/2001 Schultz et al. ............... 323/272
6,246,220 B1 * 6/2001 Isham et al. ................. 323/224
6,278,263 B1 * 8/2001 Walters et al. ............... 323/272

* cited by examiner

Primary Examiner—Shawn Riley
(74) Attorney, Agent, or Firm—Rosenberg, Klein & Lee

(57) ABSTRACT

An apparatus and method for current balance in a multi-phase DC-to-DC converter with a converter output voltage and a plurality of channel currents employs for each channel a multi-input pulse width modulator or an ordinary pulse width modulator in conjunction with a multi-input comparator to produce a respective PWM signal to regulate the corresponding channel current. In addition to the comparison of the converter output voltage with a reference signal to produce an error signal, the apparatus and method compares the error signal with a ramp signal and the corresponding channel current with each of the other channel currents with the multi-input pulse width modulator. Alternatively, a ramp signal is compared by the ordinary pulse width modulator with a signal derived from the multi-input comparator which subtracts the corresponding channel current from each other channel current and sums the error signal.

39 Claims, 11 Drawing Sheets

US 6,414,470 B1

APPARATUS AND METHOD FOR BALANCING CHANNEL CURRENTS IN A MULTI-PHASE DC-TO-DC CONVERTER

FIELD OF THE INVENTION

The present invention relates generally to a multi-phase DC-to-DC converter, and more particularly, to an apparatus and method for balancing the channel currents in a multi-phase DC-to-DC converter.

BACKGROUND OF THE INVENTION

The multi-phase DC-to-DC converter has been widely used for power supply circuits. Unfortunately, there may be current unbalance occurred between the channels thereof due to the mismatching of parameters and components between each of the phases or channels. A multi-phase DC-to-DC converter provided by U.S. Pat. No. 6,278,263 issued to Walters et al. can equally shares the load current between each of the phases or channels in the converter, by which all of the channel currents are sensed and averaged with summing circuit and scaling circuit for balance control between each of the channels. However, the circuit disclosed by this prior art is complicated due to the requirement of averaging operation of the channel currents and thus disadvantageous to integrate the converter circuit on a chip and to reduce the cost. If the averaging apparatus and method for the channel currents can be removed from a converter circuit, it will be scaled down. It is thus desired a simplified circuitry for current balance in a multi-phase DC-to-DC converter without averaging the channel currents. Moreover, it is another important issues of the method and circuit to sense each of the channel currents in the converter so as for further operation of the sensed signals each representative of a respective channel current for the control of current balance thereof. Based on the theory applied in the converter circuit of U.S. Pat. No. 6,278,263 as mentioned, it is necessary a current feedback resistor and its related circuitry to be inserted between each phase output and the control circuit of the multi-phase DC-to-DC converter to produce a current signal representative of the channel current on the respective phase or channel for the balance control thereof, which is also referred to U.S. Pat. No. 6,246,220 issued to Isham et al., for example. The current feedback resistor and its related circuitry induce additional cost and circuitry complexity and are preferred to be removed or simplified. It is therefore desired a multi-phase DC to DC converter with channel current balance based upon an alternative theory so as to simplify the feedback circuitry for sensing the channel currents thereof.

SUMMARY OF THE INVENTION

One object of the present invention is a simplified circuit for a multi-phase DC-to-DC converter with balanced channel currents.

Another object of the present invention is a method for balancing the channel currents in a multi-phase DC-to-DC converter.

Yet another object of the present invention is to simplify the feedback circuitry for sensing the channel currents in a multi-phase DC-to-DC converter.

In a multi-phase DC-to-DC converter with a converter output voltage and a plurality of channels each configured for generating a channel current, according to the present invention, the output voltage is sensed and compared with a reference signal to produce an error signal for each channel for a multi-input pulse width modulator or a multi-input comparator in conjunction with an ordinary pulse width modulator to produce a PWM signal to regulate the corresponding channel current. The multi-input pulse width modulator compares the error signal with a ramp signal and the corresponding channel current with each other of the channel currents to produce the corresponding PWM signal. Alternatively, the multi-input comparator subtracts the corresponding channel current from each other of the channel currents and sums the error signal to produce a combined signal for the ordinary pulse width modulator to compare with a ramp signal to the corresponding PWM signal.

In some embodiments, a current mirror or a pair of load devices connected with one or more input stages for the error signal, ramp signal and the other signals corresponding to each channel is provided for the PWM modulator. For some other embodiments, common gated transistors with a same bias are provided for the multi-input comparator.

For the comparisons between the channel currents, each of the channel currents is sensed to produce a feedback current sense signal in voltage type or current type. A current sense circuit to sense the channel current of each channel to produce a feedback voltage signal for the current balance control is also provided.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
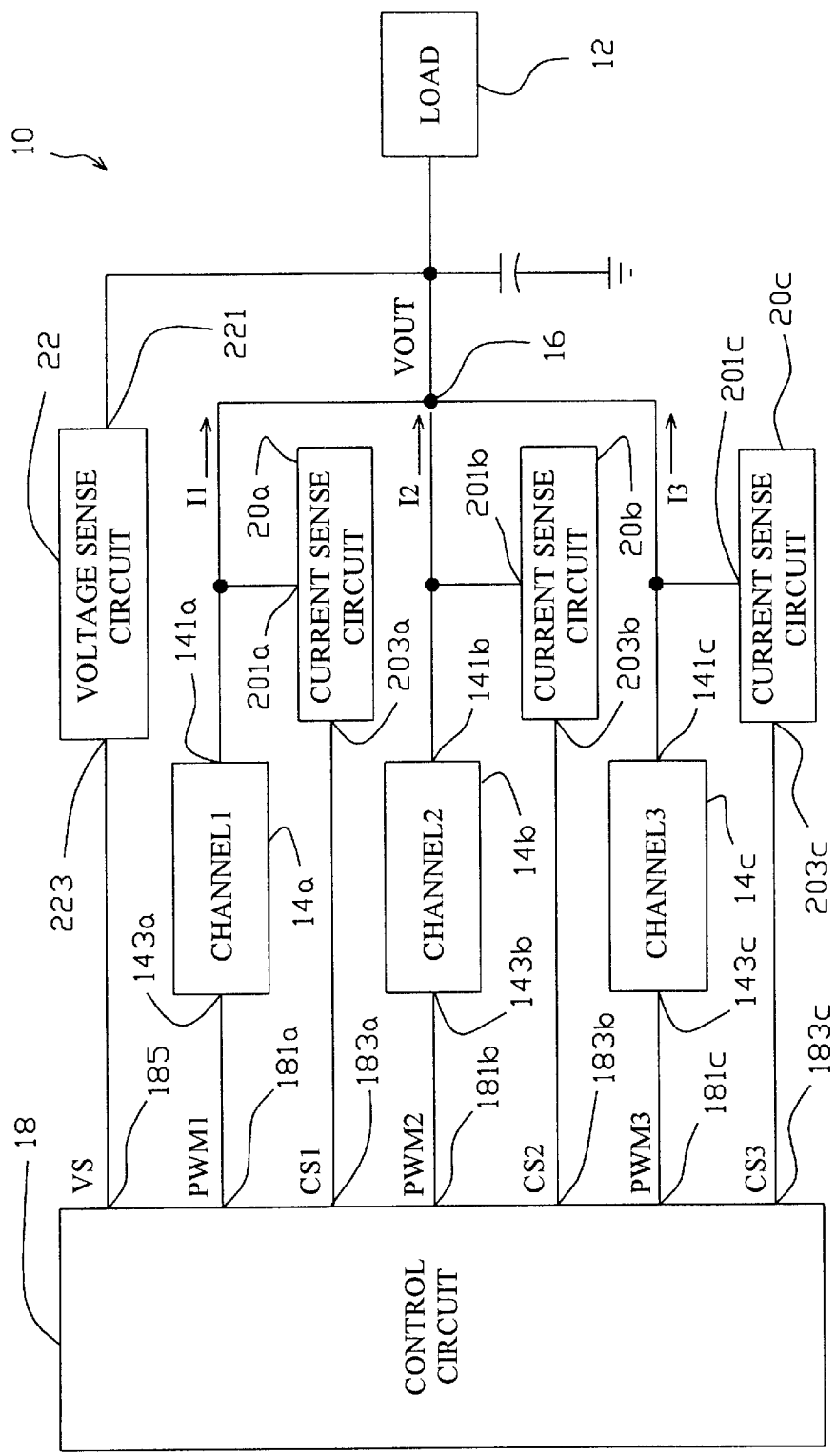
FIG. 1 shows a block diagram of a three-phase converter 10 according to the present invention.

For illustration of the features and advantages of the present invention, a three-phase converter 10 is shown with a block diagram in FIG. 1. A load 12 is supplied with a power by the converter 10 that has three channels 14a, 14b and 14c with their channel outputs 141a, 141b and 141c coupled together and to the converter output 16. The channel input 143a, 143b and 143c of the respective channel 14a, 14b and 14c is fed with respective PWM signal PWM1, PWM2 and PWM3 from a control circuit 18 with its respective control output 181a, 181b and 181c to regulate the respective channel current I1, I2 and I3 flowing through respective channel output 141a, 141b and 141c. The prior arts for the channel circuit of a DC-to-DC converter can be applied for the channels 14a, 14b and 14c. However, to balance the individual channel current I1, I2 and I3 on respective channel output 141a, 141b and 141c, three current sense circuits 20a, 20b and 20c are coupled to the channel outputs 141a, 141b and 141c with their current sense inputs 201a, 201b and 201c to sense the respective channel current I1, I2 and I3 and then produce three current sense signals CS1, CS2 and CS3 in current type or voltage type fed-back to the control circuit 18 through feedback inputs 183a, 183b and 183c from the current sense outputs 203a, 203b and 203c, respectively. Further, the converter output voltage VOUT on the converter output 16 is sensed by a voltage sense circuit 22 with the coupling of a voltage sense input 221 to produce a voltage sense signal VS in current type or voltage type fed-back to the control circuit 18 through a feedback input 185 from a voltage sense output 223. The prior arts to sense the converter output voltage VOUT and produce the feedback voltage sense signal VS can be applied for the voltage sense circuit 22.

Figure 2:
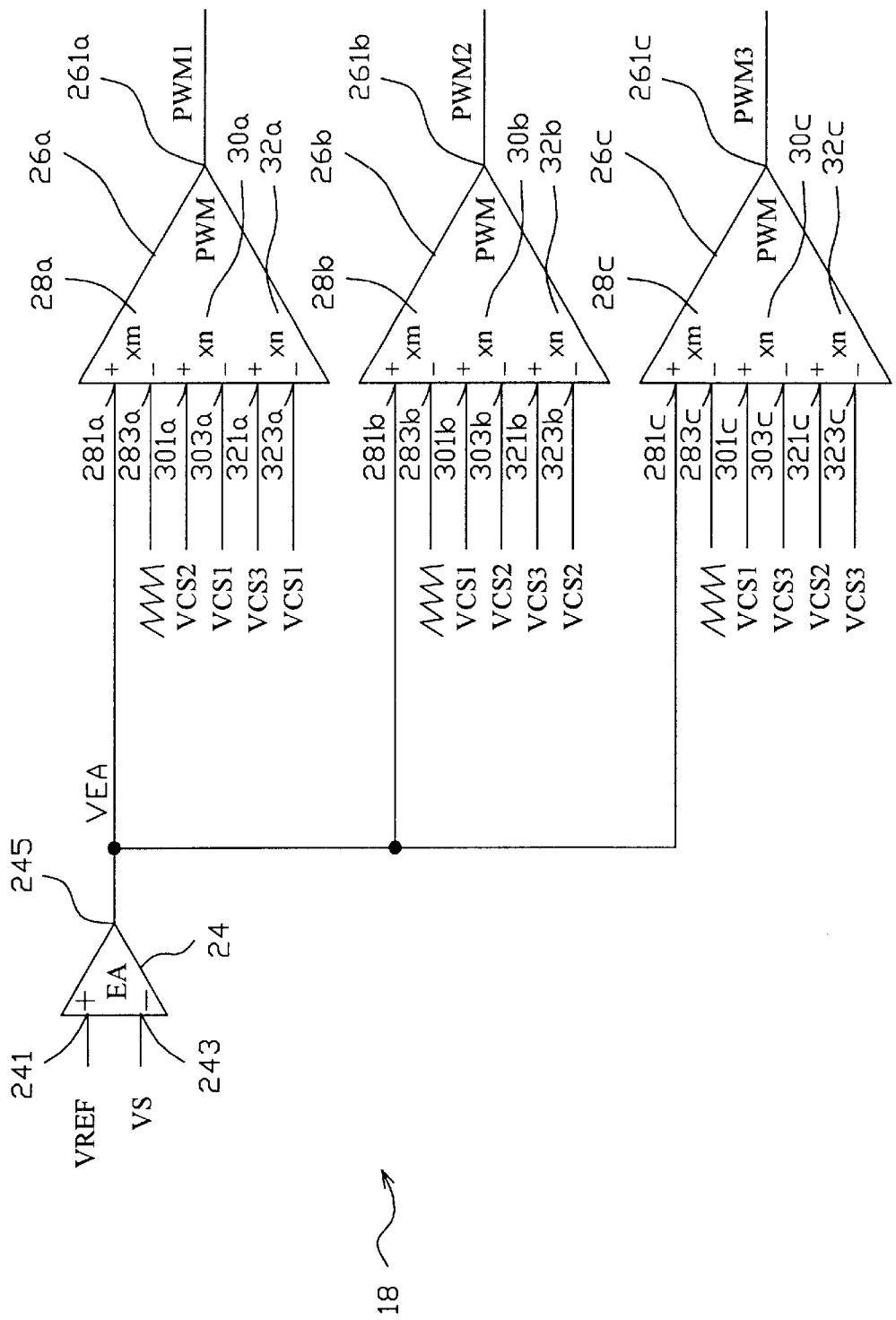
FIG. 2 shows an embodiment control circuit for the converter 10 shown in FIG. 1.

An embodiment control circuit 18 for the converter 10 shown in FIG. 1 is provided in FIG. 2, which includes an error amplifier 24 with a negative input 243 connected with the voltage sense signal VS in voltage type to be compared with a reference voltage VREF connected to the positive input 241 of the error amplifier 24 to produce an error signal VEA for three multi-input pulse width modulators 26a, 26b and 26c. The pulse width modulator 26a has three pairs of inputs 28a, 30a and 32a to compare various signals and one PWM output 261a to transmit the PWM signal PWM1. The first input pair 28a has a positive input 281a and a negative input 283a to receive the error signal VEA and a ramp signal. The second input pair 30a has a positive input 301a and a negative input 303a to receive the voltage-type current sense signals VCS2 and VCS1 representative of the channel currents flowing through the channel 2 and channel 1, respectively, and the other second input pair 32a has a positive input 321a and a negative input 323a to receive the voltage-type current sense signals VCS1 and VCS2, respectively. Furthermore, the first input pair 28a to compare the error signal VEA with the ramp signal and the other two second input pairs 30a and 32a to compare the current sense signal VCS1 with VCS2 and VCS3 have transconductance ratio of m/n. That is, the input pair 28a has a transconductance of gm×m and the input pair 30a and 32a have a transconductance of gm×n, where gm is a transconductance constant. The other two multi-input pulse width modulators 26b and 26c have architecture similar to that of the pulse width modulator 26a for channel 2 and channel 3, respectively.

However, they are configured to compare the respective current sense signals VCS2 and VCS3 with the other current sense signals, in particular, the pulse width modulator 26b compares the current sense signal VCS2 with the others VCS1 and VCS3 and the pulse width modulator 26c compares the current sense signal VCS3 with the signals VCS1 and VCS2. In other words, each modulator 26a, 26b or 26c compares its own current sense signal with those of the other channels in addition to the comparison of the error signal VEA with a ramp signal to produce respective PWM signals PWM1, PWM2 and PWM3.

Figure 3:
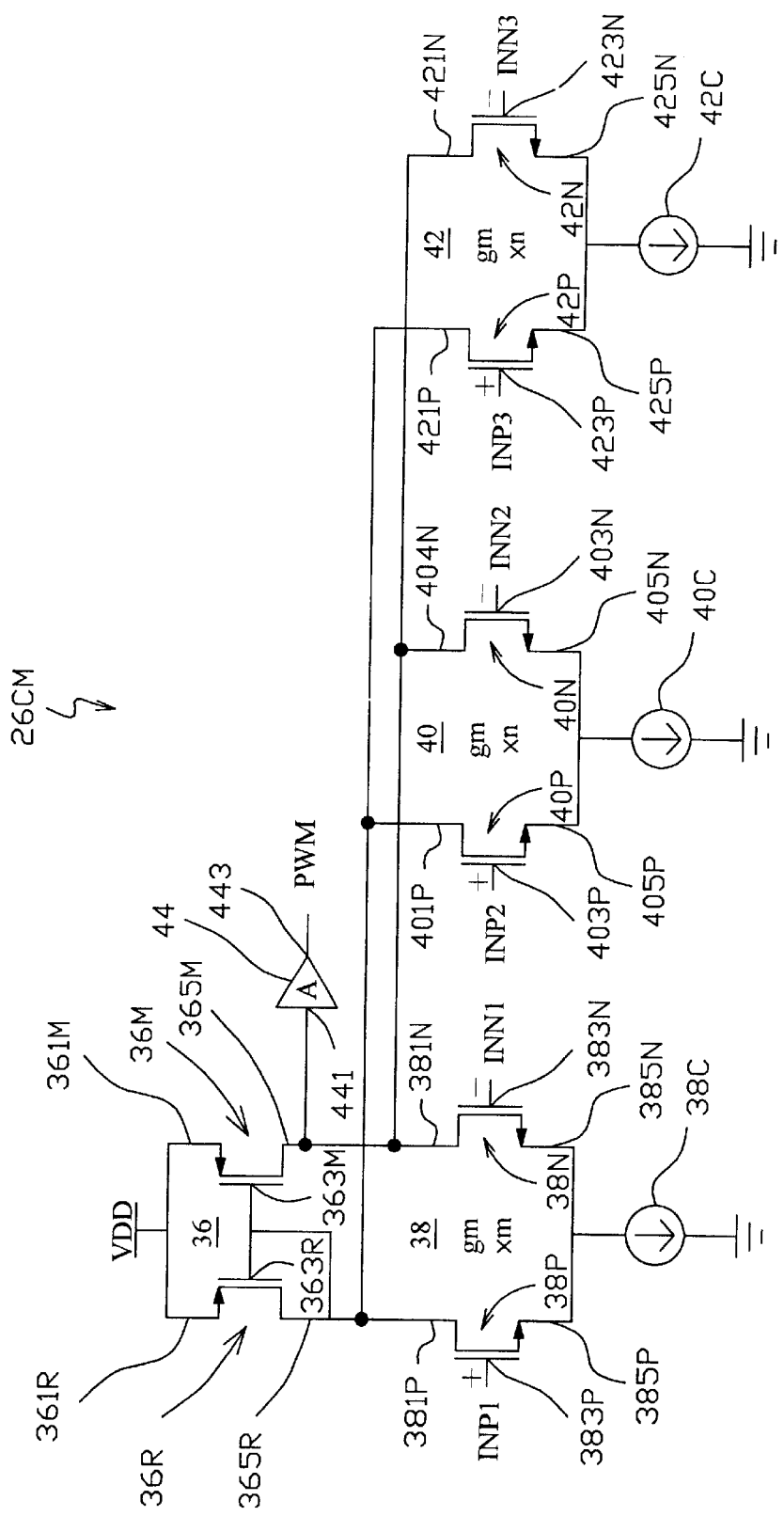
FIG. 3 shows an embodiment circuit for the multi-input pulse width modulators shown in FIG. 2.

In FIG. 3 is provided with an embodiment circuit 26CM for the multi-input pulse width modulators 26a, 26b and 26c shown in FIG. 2. The PWM circuit 26CM has a current mirror 36 composed of two MOS transistors 36R and 36M whose sources 361R and 361M are connected together and to a voltage power supply VDD and whose gates 363R and 363M are connected together and to the drain 365R of the MOS transistor 36R. The current mirror 36 provides two branches, a reference side branch and a mirror side branch with the respective drain 365R and 365M of the MOS transistors 36R and 36M. The circuit 26CM also includes three input stages 38, 40 and 42 each of them composed of one pair of MOS transistors and a current source. These three input stages are all transconductive amplifier to transform the difference between two input voltage signals to a current signal. As described referred to FIG. 2, the first input stage 38 has a transconductance of gm×m and both of the other two 40 and 42 has a transconductance of gm×n. In the input stage 38, MOS transistors 38P and 38N have their drains 381P and 381N connected to the drains 365R and 365M of the MOS transistors 36R and 36M, respectively, and their sources 385P and 385N connected together and to a current source 38c. The gates 383P and 383N of the MOS transistors 38P and 38N are the positive and negative inputs of the input stage 38, respectively. The other two input stages 40 and 42 are architectured similarly to the input stage 38 except for their inputs 403P, 403N, 423P and 423N are configured to receive a respective current sense signal from VCS1 to VCS3. The PWM output 443 of the circuit 26CM is derived from the drain 365M of the mirror side transistor 36M through an input 441 of a gain stage 44 and amplified by the gain stage 44. When the circuit 26CM is applied for the modulator shown in FIG. 2, for instance for the modulator 26a, the positive input 383P and negative input 383N of the input stage 38 receive the error signal VEA and ramp signal, respectively, the positive input 403P and negative input 403N of the input stage 40 receive the current sense signals VCS2 and VCS1, respectively, and the positive input 423P and negative input 423N of the input stage 42 receive the current sense signals VCS3 and VCS1, respectively. In particular, the correspondences of the inputs and outputs between the circuit 26CM shown in FIG. 3 and the pulse width modulators shown in FIG. 2, are listed in Table 1 as following:

TABLE 1

| 26CM/Modulator | | 26a | 26b | 26c |
|---|---|---|---|---|
| Input stage 38 | Input 383P | 281a | 281b | 281c |
|  | Input 383N | 283a | 283b | 283c |
| Input stage 40 | Input 403P | 301a | 301b | 301c |
|  | Input 403N | 303a | 303b | 303c |
| Input stage 42 | Input 423P | 321a | 321b | 321c |
|  | Input 423N | 323a | 323b | 323c |
| Gain stage 44 | Output 443 | 261a | 261b | 261c |

Figure 4:
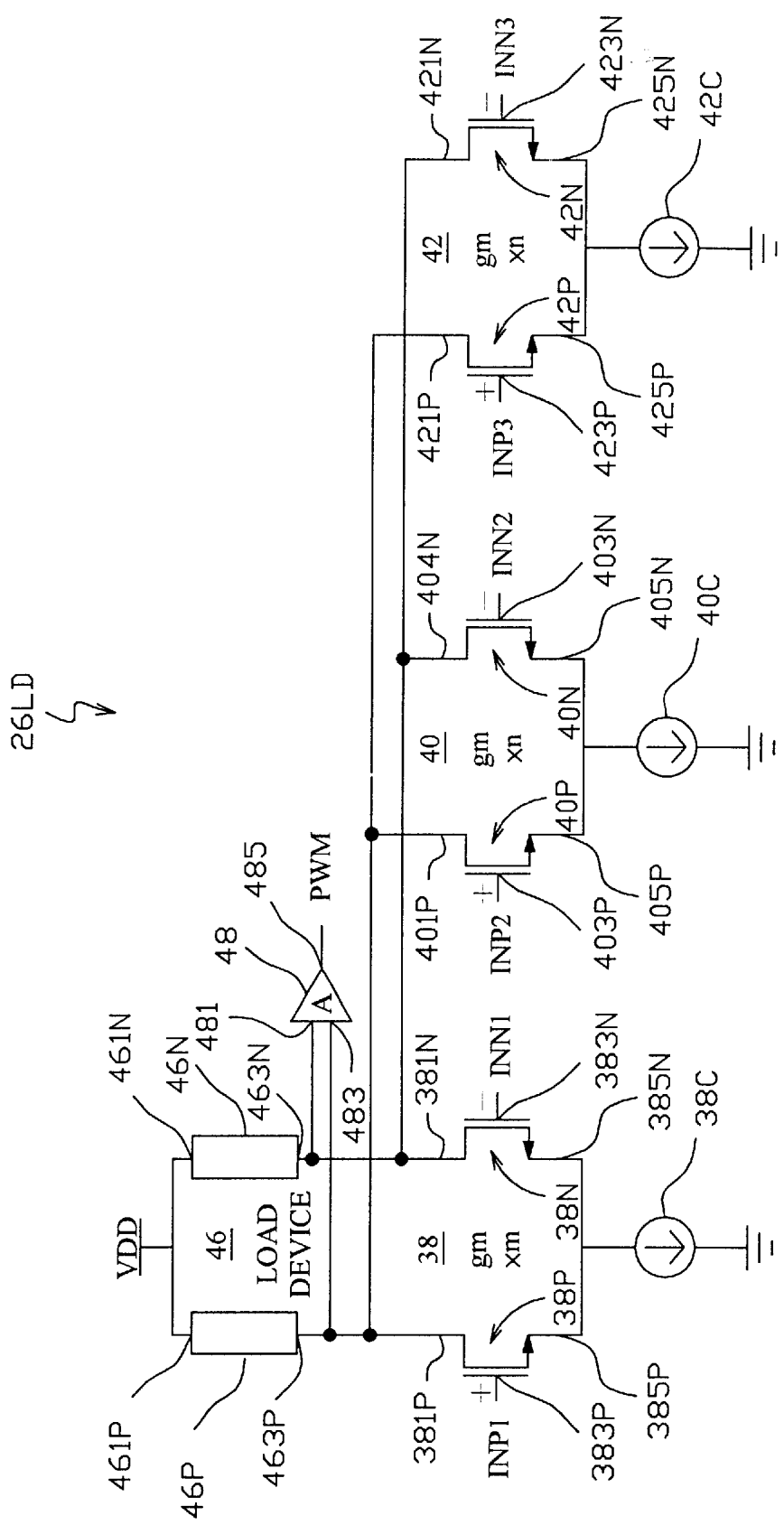
FIG. 4 shows another embodiment circuit for the multi-input pulse width modulators shown in FIG. 2.

Another embodiment PWM circuit 26LD for the multi-input modulators is shown in FIG. 4 and has the architecture similar to that of the circuit 26CM. The modulator 26LD also includes two branches connected to three input stages 38, 40 and 42, however, these two branches are provided with respective load device 46P and 46N connected to a voltage power supply VDD with their input nodes 461P and 461N. The load devices 46P and 46N are resistors or high impedances, for example. The drains 381P, 401P and 421P are connected to the output node 463P of the positive-side load device 46P and the drains 38 1N, 401N and 421N are connected to the output node 463N of the negative-side load device 46N. Further, a gain stage 48 has two inputs 481 and 483 connected the output nodes 463P and 463N, respectively, to amplify the differential voltage signal between the positive and negative sides and produce the PWM signal on its output 485. If the circuit 26LD is applied for the modulators 26a, 26b and 26c, the correspondences of the inputs and outputs between the circuit 26LD shown in FIG. 4 and the pulse width modulators shown in FIG. 2 will be the same as that in Table 1.

Figure 5:
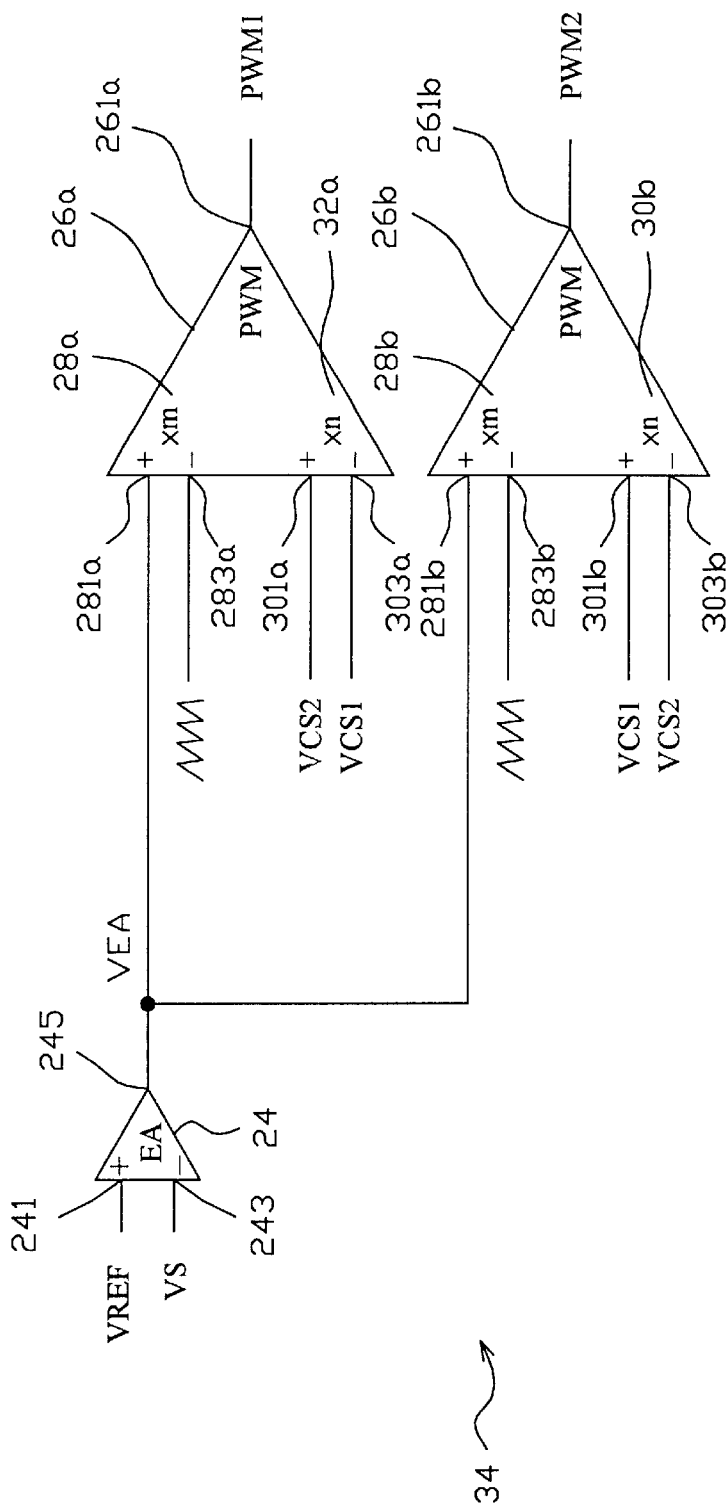
FIG. 5 shows an embodiment control circuit for a two-phase DC-to-DC converter according to the present invention.

FIG. 5 shows an embodiment control circuit 34 for a two-phase DC-to-DC converter. As in the circuit 18 shown in FIG. 2, an error amplifier 24 in the circuit 34 compares the voltage sense signal VS with a reference voltage VREF and produces an error signal VEA transmitted to multi-input pulse width modulators 26a and 26b. As in accordance with the above-mentioned theory, the modulator 26a compares the current sense signal VCS1 of channel 1 with the other current sense signal VCS2 and the modulator 26b compares the current sense signal VCS2 of channel 2 with the other current sense signal VCS1. It is readily evidenced from FIG. 5 or FIG. 2 that the control circuit of the present invention is more simplified in comparison with the prior arts, such as in U.S. Pat. No. 6,278,263. The lower the phase number of a converter is, the more advantages the control circuit thereof gains.

Figure 6:
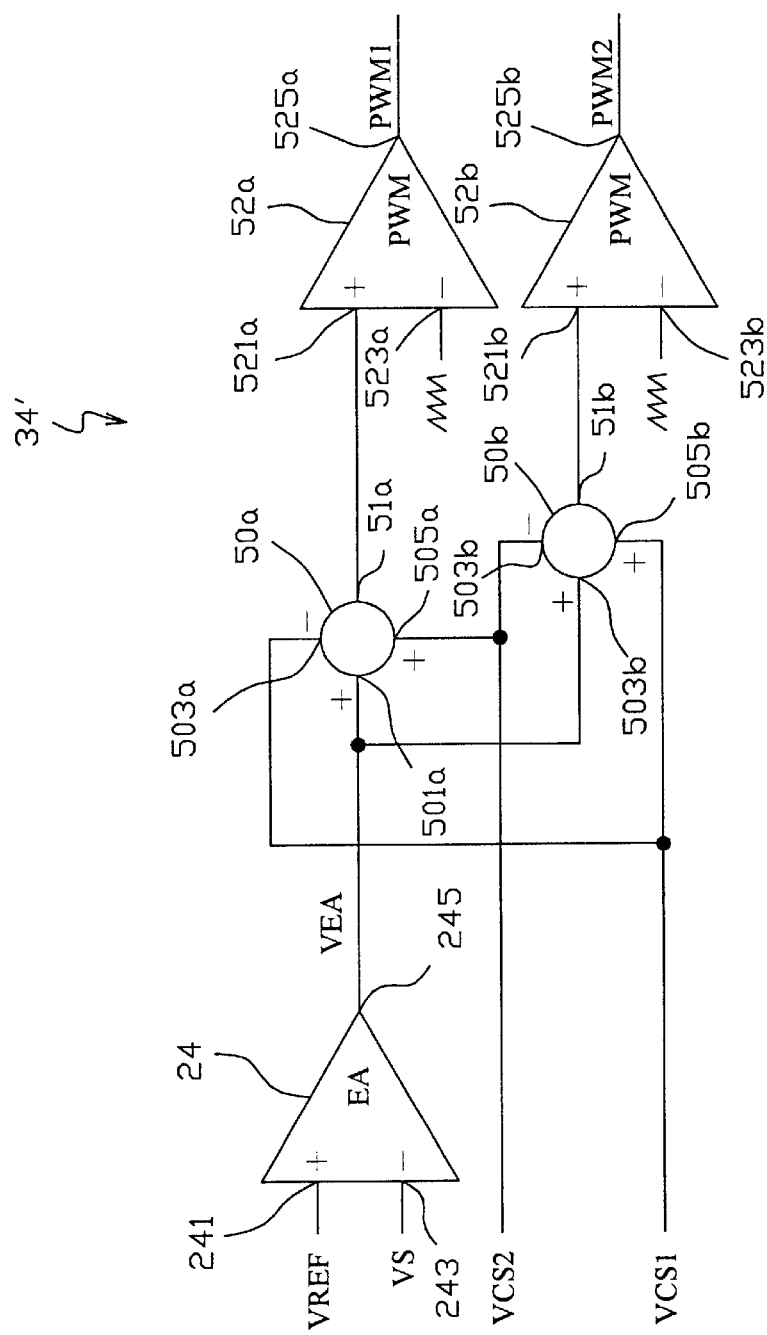
FIG. 6 shows another embodiment control circuit for a two-phase DC-to-DC converter according to the present invention.

An alternative embodiment control circuit 34' for a two phase DC-to-DC converter is shown in FIG. 6, in which the voltage sense signal VS is also compared with a reference voltage VREF by an error amplifier 24 to produce an error signal VEA. However, the signal VEA is fed into a respective multi-input summing circuit or comparator 50a and 50b that subtracts respective current sense signal from the other current sense signal. In detail, the comparator 50a for channel 1 has three inputs 501a, 503a and 505a and one output 51a, among which the inputs 501a and 505a receive the error signal VEA and the current sense signal VCS2 of the other channel and the input 503a is a negative input to receive its own current sense signal VCS1. In other words, the comparator 50a for channel 1 subtracts its own current sense signal VCS1 from the other current sense signal VCS2. The output 51a is connected to the positive input 521a of the first pulse width modulator 52a, and the negative input 523a of the modulator 52a is connected with a ramp signal. Contrarily, the comparator 50b for channel 2 subtracts its own current sense signal VCS2 from the other current sense signal VCS1 in addition to the error signal VEA.

Figure 7:
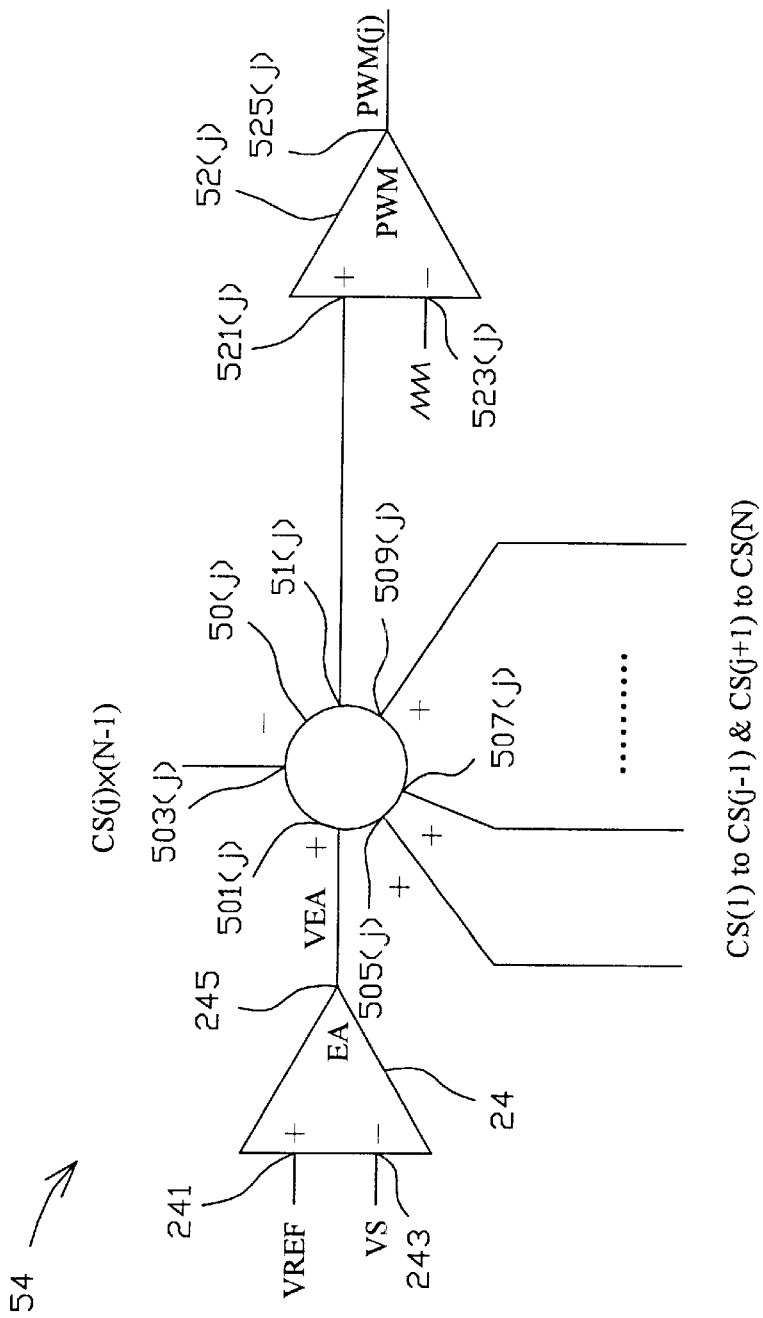
FIG. 7 shows a generalized control circuit for a multi-phase DC-to-DC converter with the architecture based on the circuit shown in FIG. 6.

In general, a comparator referred with 50(j) for the j-th channel in an N-phase DC-to-DC converter is shown in FIG. 7. The comparator 50(j) has one negative input 503(j) to receive N−1 times of signal VCS(j) and N positive inputs to receive the error signal VEA and current sense signals except for the j-th channel. In particular, signals VCS(1) to VCS(j−1) and VCS(j+1) to VCS(N) are all connected to a respective positive input of the comparator 50(j). The comparator 50(j) thus subtracts N−1 times of the current sense signal VCS(j) from the other current sense signals VCS(1) to VCS(j−1) and VCS(j+1) to VCS(N) and the error signal VEA and produces a combined error signal from 51(j) to the positive input 521(j) of the j-th pulse width modulator 52(j) to be compared with a ramp signal received from the negative input 523(j) of the modulator 52(j) to produce the j-th PWM signal PWM(j).

Figure 8:
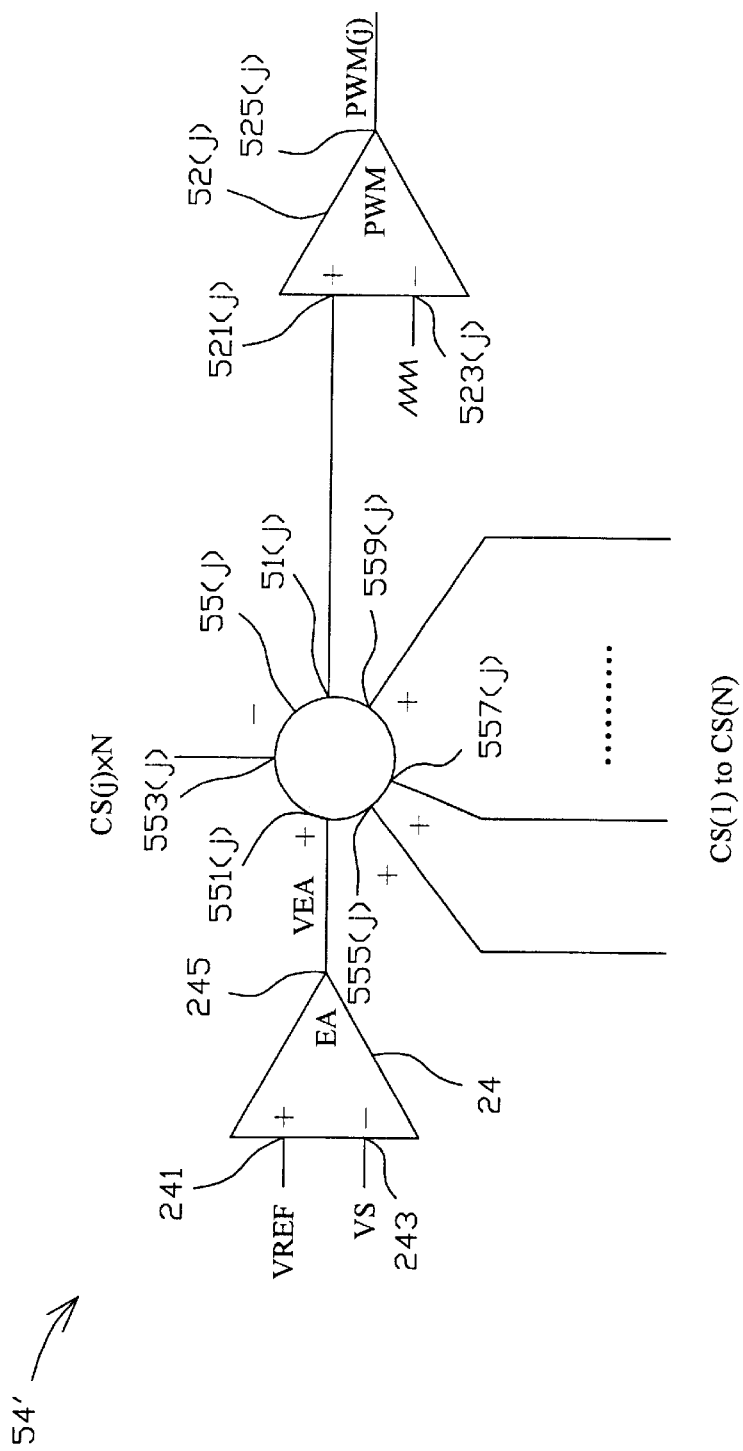
FIG. 8 shows another generalized control circuit for a multi-phase DC-to-DC converter with the architecture based on the circuit shown in FIG. 6.
Figure 9:
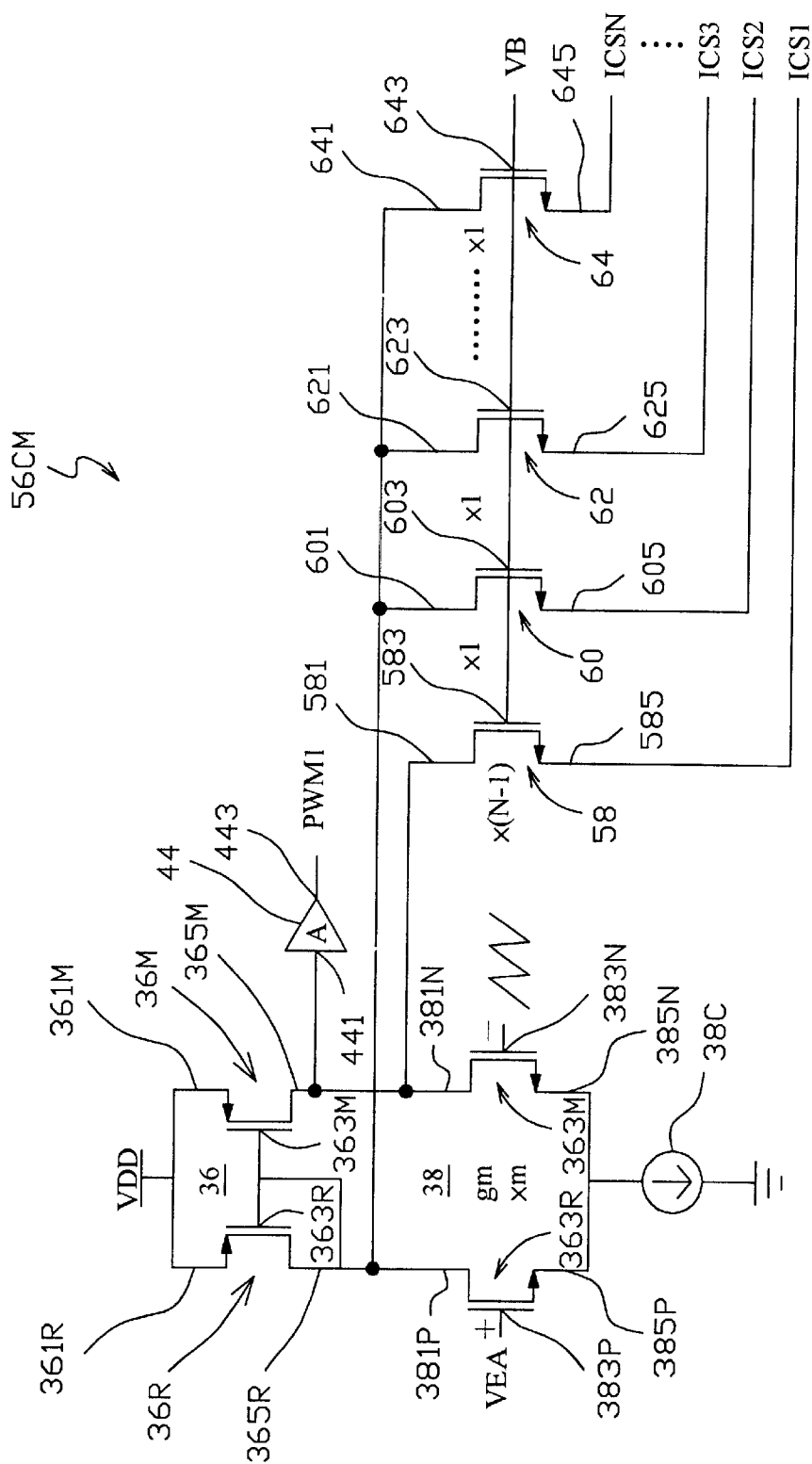
FIG. 9 shows an embodiment circuit for the general comparator 54($j$) in combination with the pulse width modulator 52($j$) shown in FIG. 7.

Another embodiment comparator 54' for the j-th channel in an N-phase DC-to-DC converter is shown in FIG. 8, in which the comparator 55(j) receives all of the current sense signals VCS(1) to VCS(N) from respective positive input and subtracts N times of the j-th current sense signal VCS(j) through the negative input 553(j). Also, the output 51(j) is connected to the positive input 521(j) of the j-th pulse width modulator 52(j) to be compared with a ramp signal received from the negative input 523(j) of the modulator 52(j) to produce the j-th PWM signal PWM(j). That is, both the circuits 54 and 54' shown in FIGS. 8 and 9 are equivalent. Again, it is noted that the current sense signals CS(1) to CS(N) are voltage or current signals, which depends on the type the comparator 50(j) or 55(j) is implemented.

An embodiment circuit 56CM is shown in FIG. 9 for the comparator 54(1) in combination with the pulse width modulator 52(1) for the channel 1 of a generalized N-phase converter as shown in FIG. 7, which has a current mirror 36 and an input stage 38 as in the circuit 26CM shown in FIG. 3. The positive and negative inputs 383P and 383N of the input stage 38 are still connected to the error signal VEA and ramp signal, respectively. However, the input stages to receive current sense signals are different from those in the circuit 26CM. In detail, the feedback current sense signals ICS1, ICS2, ... , ICSN are in current type and connected to a respective source among N MOS transistors common gated with a bias signal VB. In addition, the drain 581 of the MOS transistor 58 for the current sense signal ICS1 is connected to the drain 365M of the mirror-side MOS transistor 36M and the others of the common gated MOS transistors 60, 62, ... , 64 for the other current sense signals ICS2 to ICSN have their drains 603, 623, ... , 643 connected to the drain 365R of the reference-side MOS transistor 36R. Further, the MOS transistor 58 for the current sense signal ICS 1 is N−1 times large of any one of the other common gated MOS transistors 60, 62, ... , 64 for the other current sense signals ICS2 to ICSN. The symbols of "×(N−1)" and "×1" in the figure are denoted to the size ratio of those common gated MOS transistors 58, 60, ... , 64 for the feedback signals ICS1 to ICSN. Again, a gain stage 44 is connected to the drain 365M with its input 441 and produces the PWM signal PWM1 on its output 443 for channel 1. Likewise, the other channels are similar to that in FIG. 9 except for the larger MOS transistor 58 receives the current sense signal of the respective channel and the other common gated MOS transistors 60, 62, ... , 64 receive the other current sense signals.

Figure 10:
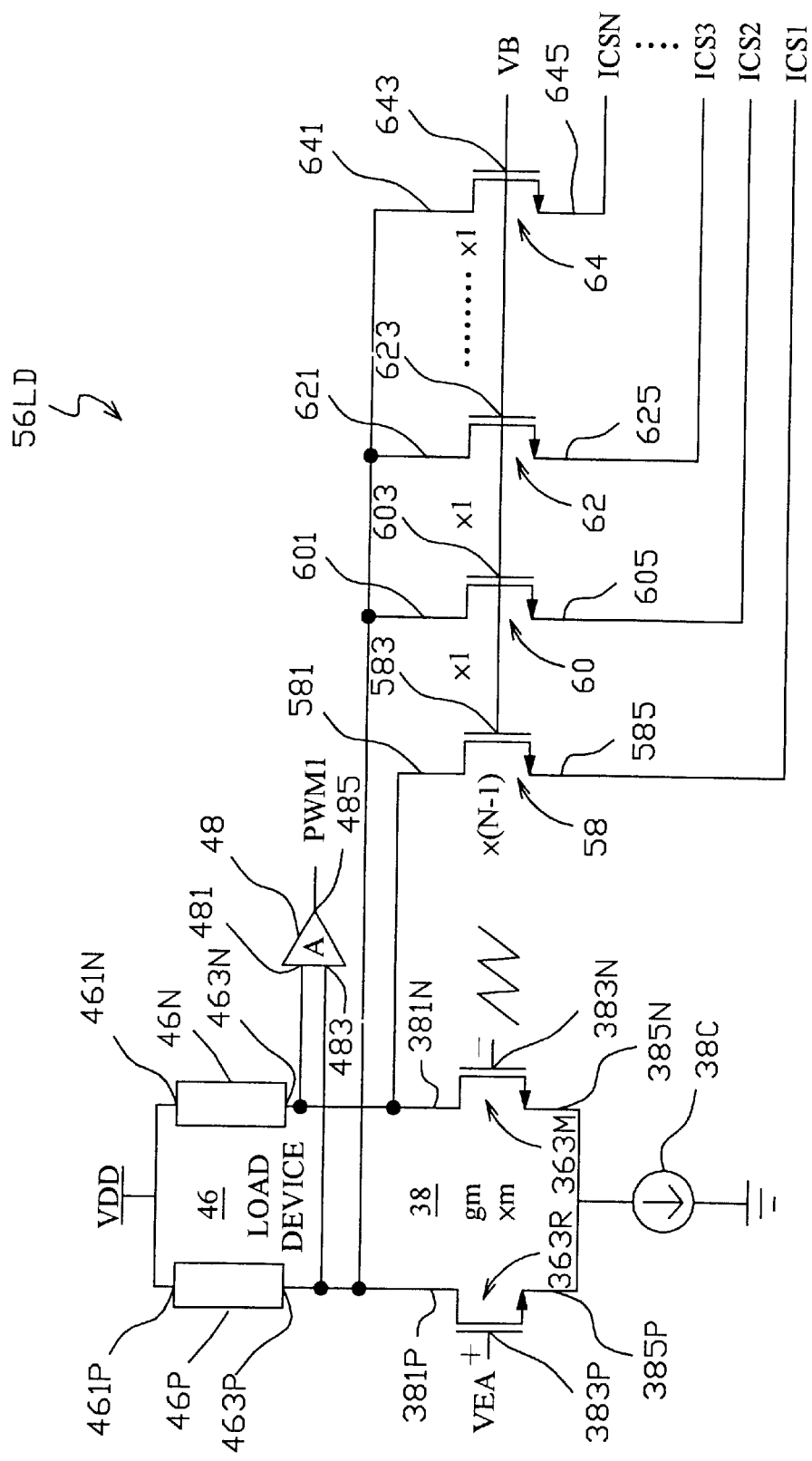
FIG. 10 shows another embodiment circuit for the general comparator 54($j$) in combination with the pulse width modulator 52($j$) shown in FIG. 7.

Another embodiment circuit 56LD is shown in FIG. 10 for the comparator 54(1) in conjunction with the pulse width modulator 52(1) for the channel 1 of a generalized N-phase converter as shown in FIG. 7, which has a pair of load devices 46 and an input stage 38 as in the circuit 26LD shown in FIG. 4. The positive and negative inputs 383P and 383N of the input stage 38 are also connected to the error signal VEA and ramp signal, respectively. The common gated MOS transistors 58, 60, ... , 64 for the current sense signals ICS1 to ICSN are configured as in the circuit shown in FIG. 9, and a gain stage 48 has its inputs 481 and 483 connected the output nodes 463P and 463N, respectively, to amplify the differential signal between the positive and negative sides and thus to produce the PWM signal PWM1 on its output 485 for channel 1.

Figure 11:
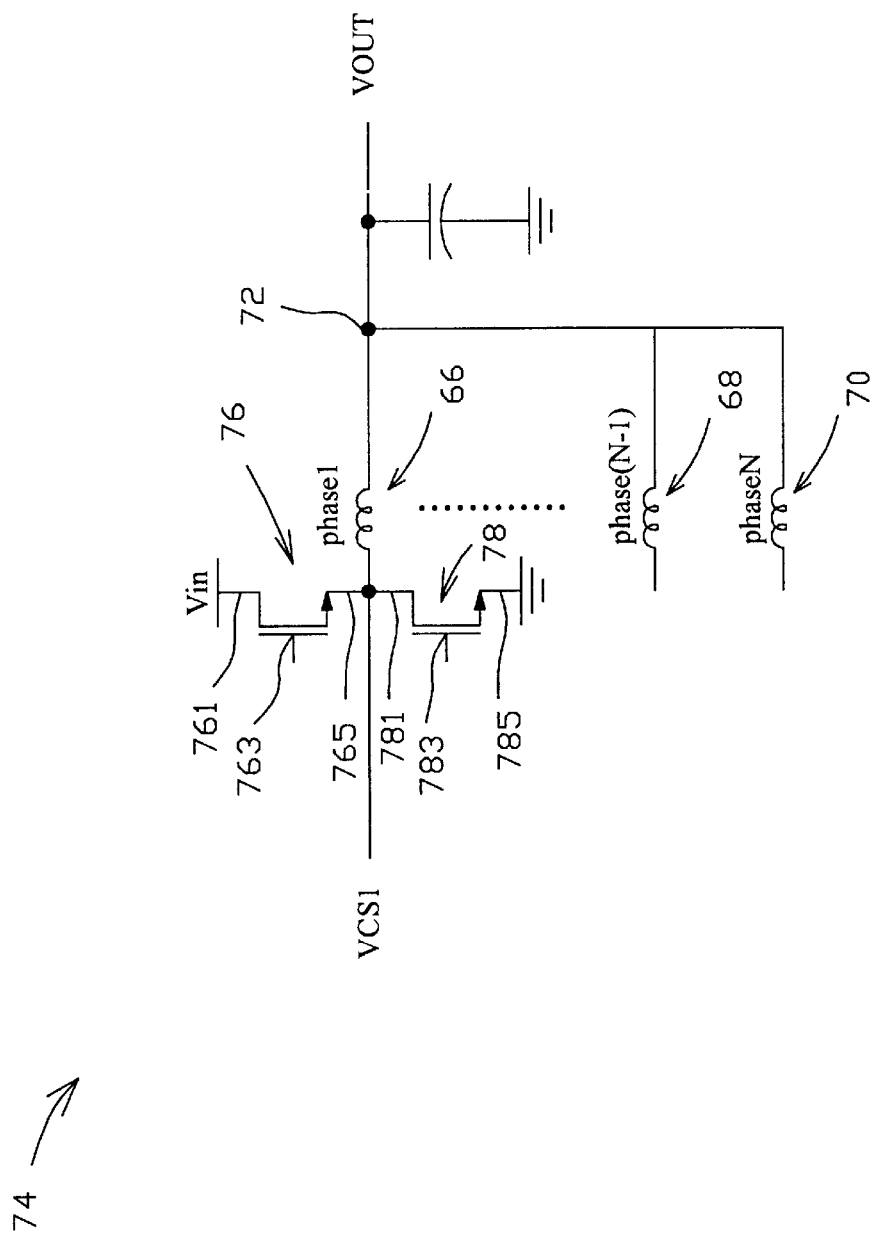
FIG. 11 shows an embodiment circuit for the current sense circuit to produce a feedback current sense signal.

Now referring to FIG. 11 for the current sense circuit of channel 1 for an example. As in the prior arts, the N channel outputs are connected together and to the converter output 72 through a respective inductor 66, ... , 68 and 70, and a pair of output switch transistors 76 and 78 are connected in series between an input voltage Vin and ground. However, the current sense signal VCS1 can be derived directly from the source 765 of the high-side switch transistor 76 or the drain 781 of the low-side switch transistor 78, instead of a feedback transistor, to sense the channel current I1, since a voltage-type signal is available for the current sense signal to be fed-back to the control circuit, for example, the circuits as shown in FIGS. 3 and 4 are applied for the control circuit.

From the above, it should be understood that the embodiments described, in regard to the drawings, are merely exemplary and that a person skilled in the art may make variations and modifications to the shown embodiments without departing from the spirit and scope of the present invention. All variations and modifications are intended to be included within the scope of the present invention as defined in the appended claims.

What is claimed is:

1. An apparatus for current balance in a multi-phase DC-to-DC converter having a converter output for providing an output voltage and a plurality of channels each configured for generating a channel current, said apparatus comprising:

a voltage sense circuit for sensing said output voltage and generating a voltage sense signal;

a plurality of current sense circuits each corresponding to one of said plurality of channels for sensing said channel current and generating a current sense signal for said corresponding channel;

a comparator for receiving said voltage sense signal and a reference signal and generating an error signal; and a plurality of multi-input pulse width modulators each for generating a PWM signal for regulating said channel current of said corresponding channel by a first input pair comparing said error signal with a ramp signal and one or more second input pair each comparing said current sense signal of said corresponding channel with each other of said plurality of current sense signals.

2. An apparatus according to claim 1 wherein each of said plurality of multi-input pulse width modulators comprises:

a current mirror including a reference branch and a mirror branch for generating a differential signal from said mirror branch;

a first input stage including a positive input for receiving said error signal and a negative input for receiving said ramp signal, said positive and negative input corresponding to said reference branch and mirror branch respectively;

one or more second input stage each including a positive input and a negative input corresponding to said reference branch and mirror branch respectively, each of said negative inputs receiving said current sense signal of said corresponding channel, each of said positive inputs receiving one of said plurality of current sense signals other than said current sense signal of said corresponding channel;

a plurality of current sources each providing a bias current for one of said first and second input stages; and a gain stage for amplifying said differential signal.

3. An apparatus according to claim 1 wherein each of said plurality of multi-input pulse width modulators comprises:

a first and second load device connecting to a power supply for providing a positive and negative branch and generating a positive and negative branch signal respectively;

a first input stage including a positive input for receiving said error signal and a negative input for receiving said ramp signal, said positive and negative input corresponding to said positive and negative branch respectively;

one or more second input stage each including a positive input and a negative input corresponding to said positive and negative branch respectively, each of said negative inputs receiving said current sense signal of said corresponding channel, each of said positive inputs receiving one of said plurality of current sense signals other than said current sense signal of said corresponding channel;

a plurality of current sources each providing a bias current for one of said first and second input stages; and a gain stage for amplifying a difference between said positive and negative branch signal.

4. An apparatus according to claim 1 wherein each of said plurality of current sense signals is a voltage type signal.

5. An apparatus according to claim 1 wherein each of said plurality of current sense signals is a current type signal.

6. An apparatus according to claim 1 wherein each of said plurality of current sense circuits includes a high-side and low-side transistor connected in series between a high-side and low-side voltage for generating said current sense signal derived from an interconnection between said high-side and low-side transistor.

7. An apparatus for current balance in an N-phase DC-to-DC converter having a converter output for providing an output voltage and N channels each configured for generating a channel current, said apparatus comprising:

a voltage sense circuit for sensing said output voltage and generating a voltage sense signal;

N current sense circuits each corresponding to one of said N channels for sensing said channel current and generating a current sense signal for said corresponding channel;

a first comparator for receiving said voltage sense signal and a reference signal and generating an error signal;

N second comparators each for generating a combined signal by a negative input receiving N−1 times of said current sense signal of said corresponding channel and N positive inputs receiving said error signal and said N current sense signals other than said current sense signal of said corresponding channel; and N pulse width modulators each for generating a PWM signal for regulating said channel current of said corresponding channel by receiving said combined signal and a ramp signal.

8. An apparatus according to claim 7 wherein each of said pulse width modulators comprises:

a current mirror including a reference branch and a mirror branch for generating a differential signal from said mirror branch;

an input stage including a positive input for receiving said combined signal corresponding to said reference branch and a negative input for receiving said ramp signal corresponding to said mirror branch;

a current source for providing a bias current for said input stage; and a gain stage for amplifying said differential signal.

9. An apparatus according to claim 7 wherein each of said pulse width modulators comprises:

a first and second load device connecting to a power supply for providing a positive and negative branch and generating a positive and negative branch signal respectively;

an input stage including a positive input for receiving said combined signal corresponding to said positive branch and a negative input for receiving said ramp signal corresponding to said negative branch a current source for providing a bias current for said input stage; and a gain stage for amplifying a difference between said positive and negative branch signal.

10. An apparatus according to claim 7 wherein each of said second comparators comprises:

a first transistor for receiving said current sense signal of said corresponding channel;

N−1 second transistor for receiving said current sense signals other than said current sense signal of said corresponding channel respectively; and a common bias for said first and second transistors;

wherein said first transistor is N−1 times of said second transistor in size.

11. An apparatus according to claim 7 wherein each of said current sense signals is a voltage type signal.

12. An apparatus according to claim 7 wherein each of said current sense signals is a current type signal.

13. An apparatus according to claim 7 wherein each of said current sense circuits includes a high-side and low-side transistor connected in series between a high-side and low-side voltage for generating said current sense signal derived from an interconnection between said high-side and low-side transistor.

14. An apparatus for current balance in an N-phase DC-to-DC converter having a converter output for providing an output voltage and N channels each configured for generating a channel current, said apparatus comprising:

a voltage sense circuit for sensing said output voltage and generating a voltage sense signal;

N current sense circuits each corresponding to one of said N channels for sensing said channel current and generating a current sense signal for said corresponding channel;

a first comparator for receiving said voltage sense signal and a reference signal and generating an error signal;

N second comparators each for generating a combined signal by a negative input receiving N times of said current sense signal of said corresponding channel and N+1 positive inputs receiving said error signal and said N current sense signals; and N pulse width modulators each for generating a PWM signal for regulating said channel current of said corresponding channel by receiving said combined signal and a ramp signal.

15. An apparatus according to claim 14 wherein each of said pulse width modulators comprises:

a current mirror including a reference branch and a mirror branch for generating a differential signal from said mirror branch;

an input stage including a positive input for receiving said combined signal corresponding to said reference branch and a negative input for receiving said ramp signal corresponding to said mirror branch;

a current source for providing a bias current for said input stage; and a gain stage for amplifying said differential signal.

16. An apparatus according to claim 14 wherein each of said pulse width modulators comprises:

a first and second load device connecting to a power supply for providing a positive and negative branch and generating a positive and negative branch signal respectively;

an input stage including a positive input for receiving said combined signal corresponding to said positive branch and a negative input for receiving said ramp signal corresponding to said negative branch;

a current source for providing a bias current for said input stage; and a gain stage for amplifying a difference between said positive and negative branch signal.

17. An apparatus according to claim 14 wherein each of said second comparators comprises:

a first transistor for receiving said current sense signal of said corresponding channel;

N second transistor for receiving said current sense signals respectively; and a common bias for said first and second transistors;

wherein said first transistor is N times of said second transistor in size.

18. An apparatus according to claim 14 wherein each of said current sense signals is a voltage type signal.

19. An apparatus according to claim 14 wherein each of said current sense signals is a current type signal.

20. An apparatus according to claim 14 wherein each of said current sense circuits includes a high-side and low-side transistor connected in series between a high-side and low-side voltage for generating said current sense signal derived from an interconnection between said high-side and low-side transistor.

21. An apparatus for current balance in an N-phase DC-to-DC converter having a converter output for providing an output voltage and N channels each configured for generating a channel current, said apparatus comprising:

a voltage sense circuit for sensing said output voltage and generating a voltage sense signal;

N current sense circuits each corresponding to one of said channels for sensing said channel current and generating a current sense signal for said corresponding channel;

a first comparator for receiving said voltage sense signal and a reference signal and generating an error signal;

N second comparators each for generating a combined signal by subtracting N−1 times of said current sense signal of said corresponding channel from said error signal and current sense signals other than said current sense signal of said corresponding channel; and N pulse width modulators each for generating a PWM signal for regulating said channel current of said corresponding channel by receiving said combined signal and a ramp signal.

22. An apparatus according to claim 21 wherein each of said pulse width modulators comprises:

a current mirror including a reference branch and a mirror branch for generating a differential signal from said mirror branch;

an input stage including a positive input for receiving said combined signal corresponding to said reference branch and a negative input for receiving said ramp signal corresponding to said mirror branch;

a current source for providing a bias current for said input stage; and a gain stage for amplifying said differential signal.

23. An apparatus according to claim 21 wherein each of said pulse width modulators comprises:

a first and second load device connecting to a power supply for providing a positive and negative branch and generating a positive and negative branch signal respectively;

an input stage including a positive input for receiving said combined signal corresponding to said positive branch and a negative input for receiving said ramp signal corresponding to said negative branch a current source for providing a bias current for said input stage; and a gain stage for amplifying a difference between said positive and negative branch signal.

24. An apparatus according to claim 21 wherein each of said second comparators comprises:

a first transistor for receiving said current sense signal of said corresponding channel;

N−1 second transistor for receiving said current sense signals other than said current sense signal of said corresponding channel respectively; and a common bias for said first and second transistors;

wherein said first transistor is N-I times of said second transistor in size.

25. An apparatus according to claim 21 wherein each of said second comparators comprises:

a first transistor for receiving said current sense signal of said corresponding channel;

N second transistor for receiving said current sense signals respectively; and a common bias for said first and second transistors;

wherein said first transistor is N times of said second transistor in size.

26. An apparatus according to claim 21 wherein each of said current sense signals is a voltage type signal.

27. An apparatus according to claim 21 wherein each of said current sense signals is a current type signal.

28. An apparatus according to claim 21 wherein each of said current sense circuits includes a high-side and low-side transistor connected in series between a high-side and low-side voltage for generating said current sense signal derived from an interconnection between said high-side and low-side transistor.

29. A method for current balance in a multi-phase DC-to-DC converter having a converter output for providing an output voltage and a plurality of channels each configured for generating a channel current, said method comprising the steps of:

sensing said output voltage to thereby determine a voltage sense signal;

sensing each of said plurality of channel currents to thereby determine a plurality of current sense signals;

comparing said voltage sense signal with a reference signal to thereby determine an error signal;

generating a plurality of PWM signals by a plurality of multi-input pulse width modulators each comparing said error signal with a ramp signal and one of said plurality of current sense signals with each other of said plurality of current sense signals; and regulating said channel currents with said plurality of PWM signals.

30. A method according to claim 29 further comprising the steps of:

connecting a high-side and low-side transistor in series between a high-side and low-side voltage; and deriving from an interconnection between said high-side and low-side transistor to thereby determine said current sense signal.

31. A method for current balance in a multi-phase DC-to-DC converter having a converter output for providing an output voltage and a plurality of channels each configured for generating a channel current, said method comprising the steps of:

sensing said output voltage to thereby determine a voltage sense signal;

sensing each of said plurality of channel currents to thereby determine a plurality of current sense signals;

comparing said voltage sense signal with a reference signal to thereby determine an error signal;

further comparing said error signal with a ramp signal to thereby determine a first differential signal;

generating a plurality of second differential signals each by comparing a respective one of said plurality of current sense signals with each other of said plurality of current sense signals;

summing said first and second differential signals to thereby determine a respective combined differential signal;

generating a plurality of PWM signals each responsive to said respective combined differential signal; and regulating said channel currents with said plurality of PWM signals.

32. A method according to claim 31 further comprising the steps of:

connecting a high-side and low-side transistor in series between a high-side and low-side voltage; and deriving from an interconnection between said high-side and low-side transistor to thereby determine said current sense signal.

33. A method according to claim 31 further comprising the steps of amplifying said respective combined differential signal.

34. A method for current balance in an N-phase DC-to-DC converter having a converter output for providing an output voltage and N channels each configured for generating a channel current, said method comprising the steps of:

sensing said output voltage to thereby determine a voltage sense signal;

sensing each of said channel currents to thereby determine N current sense signals;

comparing said voltage sense signal with a reference signal to thereby determine an error signal;

generating N PWM signals each derived from a respective differential signal produced by subtracting a ramp signal and N−1 times of a respective one of said current sense signals from a summation of said error signal and each other of said plurality of current sense signals; and regulating said channel currents with said N PWM signals.

35. A method according to claim 34 further comprising the steps of:

connecting a high-side and low-side transistor in series between a high-side and low-side voltage; and deriving from an interconnection between said high-side and low-side transistor to thereby determine said current sense signal.

36. A method according to claim 34 further comprising the steps of amplifying said respective differential signal.

37. A method for current balance in an N-phase DC-to-DC converter having a converter output for providing an output voltage and N channels each configured for generating a channel current, said method comprising the steps of:

sensing said output voltage to thereby determine a voltage sense signal;

sensing each of said channel currents to thereby determine N current sense signals;

comparing said voltage sense signal with a reference signal to thereby determine an error signal;

subtracting N−1 times of a respective one of said current sense signals from a summation of said error signal and each other of said plurality of current sense signals to thereby determine a. respective combined signal;

generating N PWM signals each derived from a respective differential signal produced by comparing said respective combined signal with a ramp signal; and regulating said channel currents with said PWM signals.

38. A method according to claim 37 further comprising the steps of:

connecting a high-side and low-side transistor in series between a high-side and low-side voltage; and deriving from an interconnection between said high-side and low-side transistor to thereby determine said current sense signal.

39. A method according to claim 37 further comprising the steps of amplifying said respective differential signal.

* * * * *

(12) EX PARTE REEXAMINATION CERTIFICATE (8572nd)
United States Patent
Liu et al.

(10) Number: US 6,414,470 C1
(45) Certificate Issued: Sep. 27, 2011

(54) APPARATUS AND METHOD FOR BALANCING CHANNEL CURRENTS IN A MULTI-PHASE DC-TO-DC CONVERTER

(75) Inventors: Jing-Meng Liu, Hsinchu (TW); Liang-Pin Tai, Tainan (TW); Hung-I Wang, Changhua (TW)

(73) Assignee: Richtek Technology Corp., Chupei, Hsinchu (TW)

Reexamination Request:
No. 90/011,184, Aug. 25, 2010

Reexamination Certificate for:
Patent No.: 6,414,470
Issued: Jul. 2, 2002
Appl. No.: 10/051,136
Filed: Jan. 22, 2002

(51) Int. Cl.
*H02M 3/04* (2006.01)
*H02M 3/158* (2006.01)
*H02J 1/10* (2006.01)

(52) U.S. Cl. ........................................ 323/272; 323/285
(58) Field of Classification Search .................... 323/272
See application file for complete search history.

(56) References Cited

U.S. PATENT DOCUMENTS 6,137,274 A * 10/2000 Rajagopalan
6,278,263 B1 * 8/2001 Walters
6,414,470 B1 * 7/2002 Liu
6,459,602 B1 * 10/2002 Lipcsei

FOREIGN PATENT DOCUMENTS

JP 1118415 1/1999
JP 200137210 2/2001

OTHER PUBLICATIONS

Certified English Translation of JP2001–137210.
Certified English Translation of JPH11–18415.
CS5323 Data Sheet.

* cited by examiner

*Primary Examiner* — Linh M. Nguyen

(57) ABSTRACT

An apparatus and method for current balance in a multi-phase DC-to-DC converter with a converter output voltage and a plurality of channel currents employs for each channel a multi-input pulse width modulator or an ordinary pulse width modulator in conjunction with a multi-input comparator to produce a respective PWM signal to regulate the corresponding channel current. In addition to the comparison of the converter output voltage with a reference signal to produce an error signal, the apparatus and method compares the error signal with a ramp signal and the corresponding channel current with each of the other channel currents with the multi-input pulse width modulator. Alternatively, a ramp signal is compared by the ordinary pulse width modulator with a signal derived from the multi-input comparator which subtracts the corresponding channel current from each other channel current and sums the error signal.

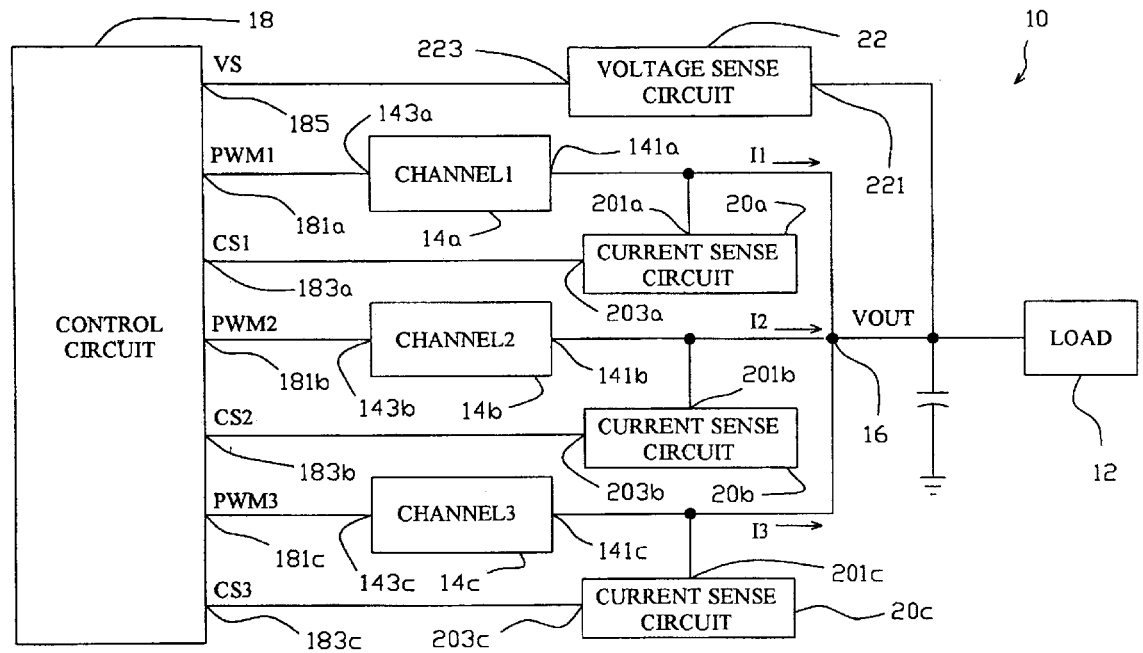

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 29 and 34 is confirmed.

Claims 1-28, 30-33 and 35-39 were not reexamined.

* * * * *